US008392633B2

(12) United States Patent
Gulati et al.

(10) Patent No.: US 8,392,633 B2
(45) Date of Patent: Mar. 5, 2013

(54) SCHEDULING REQUESTERS OF A SHARED STORAGE RESOURCE

(75) Inventors: Ajay Gulati, Mountain View, CA (US); Mustafa Uysal, Vacaville, CA (US); Arif A. Merchant, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1189 days.

(21) Appl. No.: 12/243,216

(22) Filed: Oct. 1, 2008

(65) Prior Publication Data
US 2010/0083262 A1 Apr. 1, 2010

(51) Int. Cl.
G06F 3/00 (2006.01)
G06F 5/00 (2006.01)
(52) U.S. Cl. ............................ 710/36; 718/100; 718/102
(58) Field of Classification Search ...................... 710/36
See application file for complete search history.

(56) References Cited

U.S. PATENT DOCUMENTS

| 5,072,363 | A * | 12/1991 | Gallagher | 710/241 |
|---|---|---|---|---|
| 7,047,337 | B2 * | 5/2006 | Armstrong et al. | 710/200 |
| 7,062,582 | B1 * | 6/2006 | Chowdhuri | 710/116 |
| 2005/0015535 | A1 * | 1/2005 | Lindsay et al. | 710/306 |
| 2007/0121499 | A1 * | 5/2007 | Pal et al. | 370/230 |
| 2007/0271562 | A1 * | 11/2007 | Schumacher et al. | 718/100 |
| 2009/0161684 | A1 * | 6/2009 | Voruganti et al. | 370/412 |

OTHER PUBLICATIONS

USENIX Association, Proc. of the Third USENIX Conference on File and Storage Technologies, 15 pages (Mar. 31, 2004).

J.C.R. Bennett et al., WF2Q: Worst-Case Fair Weighted Fair Queueing, Proc. of INFOCOM '96, pp. 120-128 (Mar. 1996).
J. Bruno et al., Disk Scheduling with Quality of Service Guarantees, Proc. of the IEEE Int'l Conf. on Multimedia Computing and Systems, vol. 2, IEEE Computer Society, 6 pages (1999).
P. Goyal et al., Start-Time Fair Queuing: A Scheduling Algorithm for Integrated Services Packet Switching Networks, Technical Report CS-TR-96-02, UT Austin, pp. 1-27 (Jan. 1996).
M. Karlsson et al., Triage: Performance Isolation and Differentiation for Storage Systems, Trans. Storage, 1(4):457-480 (2005).
C.R. Lumb, Facade: Virtual Storage Devices with Performance Guarantees, Proc. of Conf. on File and Storage Technologies (FAST '03), pp. 131-144 (Mar. 2003).
A.L.N. Reddy et al., I/O Issues in a Multimedia System, IEEE Computer, 27(3):69-74 (1994).
P.J. Shenoy et al., Cello: A Disk Scheduling Framework for Next Generation Operating Systems, Proc. of ACM SIGMETRICS, pp. 44-55 (Jun. 1998).
T.M. Wong et al., Zygaria: Storage Performance as a Managed Resource, Proc. of RTAS, pp. 125-134 (Apr. 2006).
J.C. Wu et al., The Design and Implementation of AQuA: An Adaptive Quality of Service Aware Object-Based Storage Device, Proc. of IEEE/NASA Goddard Conf. on Mass Storage Systems and Technologies (MSST 2006), pp. 209-218 (May 2006).
M. Wachs et al., Argon: Performance Insulation for Shared Storage Servers, FAST '07, Proc. of the 5th Conf. on USENIX Conf. on File and Storage Technologies, pp. 5-5 (2007).
M. Shreedhar et al., Efficient Fair Queuing Using Deficit Round Robin, IEEE/ACM Transactions on Networking, vol. 4, No. 3, 22 pages (Jun. 1996).

(Continued)

*Primary Examiner* — Idriss N Alrobaye
*Assistant Examiner* — Brooke Taylor

(57) ABSTRACT

To schedule workloads of requesters of a shared storage resource, a scheduler specifies relative fairness for the requesters of the shared storage resource. In response to the workloads of the requesters, the scheduler modifies performance of the scheduler to deviate from the specified relative fairness to improve input/output (I/O) efficiency in processing the workloads at the shared storage resource.

17 Claims, 2 Drawing Sheets

OTHER PUBLICATIONS

A. Gulati et al., pClock: An Arrival Curve Based Approach for QoS Guarantees in Shared Storage Systems, Proc. of the ACM Sigmetrics Conf., pp. 13-24 (2007).

W. Jin et al., Interposed Proportional Sharing for a Storage Service Utility, SIGMETRICS '04/Performance '04: Proc. of the Joint Int'l Conf. on Measurement and Modeling of Computer Systems, pp. 37-48 (2004).

D.D. Chambliss et al., Performance Virtualization for Large-Scale Storage Systems, Proc. of the 22nd Symposium on Reliable Distributed Systems (SRDS 2003), IEEE Computer Society, pp. 109-118 (Oct. 2003).

Y. Wang et al., Proportional-Share Scheduling for Distributed Storage Systems, Proc. 5th USENIX Conf. on File and Storage Technologies (FAST '07), 14 pages (Feb. 2007).

M. Uysal et al., U.S. Appl. No. 11/527,868, entitled "Prefetching Data in Distributed Storage Systems," filed Sep. 27, 2006, pp. 1-24, Figs. 1-8.

Zygaria: Storage performance as a managed resource; Theodore M. Wong, Richard A. Golding, Caixue Lin, and Ralph A. Becker-Szendy IBM Almaden Research Center, San Jose, CA.

Zygaria: Storage performance as a managed resource; Theodore M. Wong, Richard A. Golding, Caixue Lin, and Ralph A. Becker-Szendy; IBM Almaden Research Center, San Jose, CA; 10 pages.

Cruz, R.L., "Quality of Service Guarantees in Virtual Circuit Switched Networks," IEEE Journal on Selected Areas in Communications, Aug. 1995, pp. 1048-1056, vol. 13, No. 6.

Demers, A. et al., "Analysis and Simulation of a Fair Queuing Algorithm," Journal of Internetworking Research and Experience, Sep. 1990, pp. 3-26, vol. 1(1).

Golestani, S., "A Self-Clocked Fair Queueing Scheme for Broadband Applications," INFOCOM '94, Networking for Global Communications, 13th Proc. IEEE, 1994, pp. 636-646, vol. 2.

Greenberg, A.G. et al., "How Fair Is Fair Queuing?", Journal of the Association for Computing Machinery, Jul. 1992, pp. 568-598, vol. 39, No. 3.

Huang, L. et al., Multi-Dimensional Storage Virtualization, SIGMETRICS/Performance '04: Proceedings of the joint international conference on Measurement and modeling of computer systems, Jun. 2004, pp. 14-24, ACM Press, New York, NY.

Sariowan, H. et al., "Scheduling for Quality of Service Guarantees Via Service Curves," Proceedings of the International Conference on Computer Communications and Networks (ICCCN) 1995, pp. 512-520.

* cited by examiner

SCHEDULING REQUESTERS OF A SHARED STORAGE RESOURCE

BACKGROUND

In a typical information technology (IT) enterprise, storage resources are shared by multiple applications to improve utilization, cost, and operational efficiency. In many cases, storage systems that are shared by multiple applications do not attempt to distinguish between the different applications. Rather, a shared storage system attempts to optimize the overall performance of the storage system and to treat all requests the same. Often, a scheduler associated with storage system attempts to enhance overall throughput of the storage system, based on the conventional belief that enhancing the overall throughput is good for all applications accessing the storage system. For applications that may desire higher performance from the storage system, dedicated storage resources can be allocated to such applications. However, dedicating storage resources to applications is inflexible and inefficient.

BRIEF DESCRIPTION OF THE DRAWINGS

Some embodiments of the invention are described, by way of example, with respect to the following figures.

DETAILED DESCRIPTION

Figure 1:
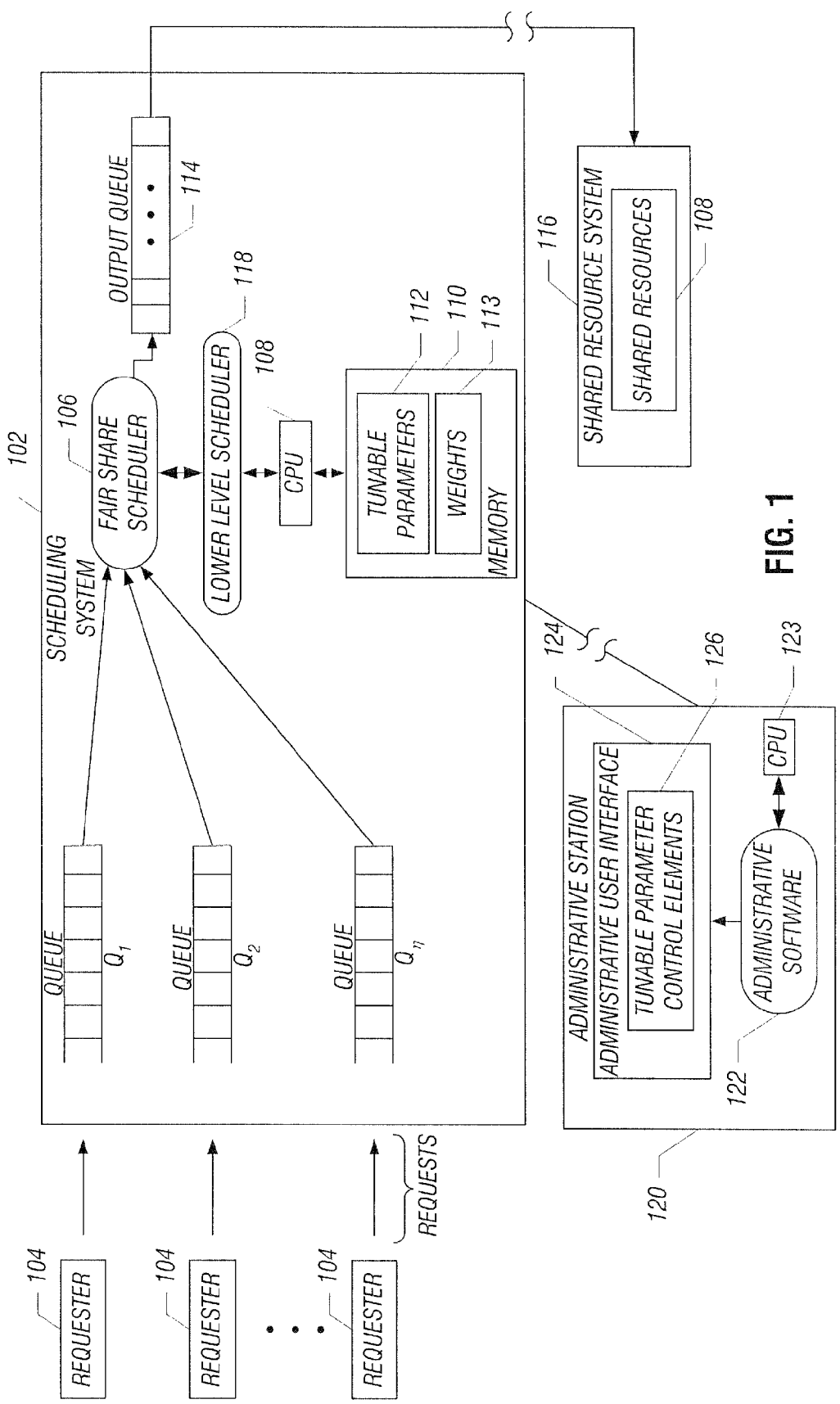
FIG. 1 illustrates an example arrangement that includes requesters of a shared storage resource, and a scheduler to perform scheduling of requests from the requesters in accordance with an embodiment.

In accordance with some embodiments, a scheduler is provided that schedules requests from requesters of a shared storage resource. A "request" refers to a command, message, or other indication that is submitted by a requester to perform an action at the shared storage resource, such as to perform a read or a write of data. Requesters can be software applications or hardware devices, and the shared storage resource can be any storage resource capable of being shared by multiple requesters. Examples of the shared storage resource include any type of storage device or system (including disk-based storage devices or other types of storage devices).

The scheduler is able to specify relative fairness for the requesters of the shared storage resource. Such a scheduler is referred to as a "fair share scheduler." "Relative fairness" refers to settings for the corresponding requesters to achieve a proportional share of the shared storage resource by the requesters. A proportional share of the shared storage resource is a proportion (or weight) of the shared storage resource that is to be allocated to the corresponding requester during some measurement time duration (where this measurement duration is referred to as the fairness granularity).

In accordance with some embodiments, the fair share scheduler is able to balance fairness, as indicated by the proportional shares corresponding to the requesters, with input/output (I/O) efficiency. I/O efficiency refers to some measurable indication of how I/O cycles or accesses are being performed at the shared storage resource without wasteful or unnecessary involvement of physical devices that are part of the shared storage resource (e.g., wasteful disk seeks, jumping around to different parts of a storage device in accessing data instead of retrieving a sequence of data, and so forth). Examples of I/O cycles or accesses include accesses of a disk-based storage or other type of storage device.

Under certain conditions, I/O efficiency may be lost due to strict adherence to proportional sharing of the shared storage resource. The fair share scheduler is configured to find the balance between the opposing forces of proportional sharing and I/O efficiency. Balancing of fairness and I/O efficiency involves trading off some amount of fairness to improve I/O efficiency.

I/O efficiency can be improved if the fairness granularity is temporarily relaxed, where the fairness granularity refers to the time duration over which a QoS (quality of service) mechanism of the fair share scheduler guarantees fairness in specified proportional shares to corresponding requesters. The fair share scheduler uses an adaptive mechanism to improve the I/O efficiency.

In accordance with some embodiments, the adaptive mechanism to balance fairness and I/O efficiency is able to set values for one or more predefined parameters. One such parameter is the batch size for a particular requester. A batch is a set of requests from a requester that is issued consecutively without interruption from other requesters. A batch size refers to the number of requests in such a batch. In accordance with some embodiments, variable size batching is enabled so that the batch size of any particular requester can be varied to balance fairness versus I/O efficiency.

Another parameter that can be adjusted by the adaptive mechanism in the scheduler is bounded concurrency, where concurrency refers to the number of requests outstanding at the shared storage resource. Bounded concurrency refers to setting a maximum number of total requests that can be outstanding at any one time at the shared storage resource.

The ability to vary batch size allows a requester to have a different batch size from the batch size that the requester would otherwise receive based on its assigned proportional share of the shared storage resource. The ability to vary batch size is useful for workloads that exhibit spatial locality since increasing the number of requests that exhibit spatial locality reduces delays that may be associated with disk seeks (assuming that the shared storage resource is a disk-based storage device). Submitting requests exhibiting spatial locality allows for improved I/O efficiency at the shared storage resource. A "workload" refers to tasks performed in response to a request of a requester.

Adjusting concurrency allows the scheduler to keep a sufficient level of concurrency so that a lower level scheduler is able to reorder the multiple concurrent requests (potentially from different requesters) to enhance I/O efficiency at the shared storage resource. For example, I/O efficiency can be enhanced to reduce mechanical latencies (reduce disk seeks, for example), or to allow more parallelism within the storage device.

Effectively, in accordance with some embodiments, a scheduling mechanism includes at least two levels of schedulers: (1) the fair share scheduler that performs scheduling based on assigned shares of the requesters, batch sizes, and concurrency; and (2) a lower level scheduler associated with a shared storage resource that is able to reorder requests currently pending at the shared storage resource to enhance I/O efficiency.

Note that the concurrency at the lower-level scheduler is bounded so that fairness guarantees can be enforced. In accordance with some embodiments, the scheduling mechanism is effective in improving I/O efficiency while slightly increasing the fairness granularity for QoS guarantees.

Parameter values such as batch size and concurrency can be either statically or adaptively set. The static approach involves measuring I/O efficiency and fairness granularity for some number of synthetic (simulated) workload combinations. Batch sizes and concurrencies for these synthetic workload combinations are known. When the scheduler is presented with an actual combination of workloads, the characteristics of the workloads can be measured, and mapped to the corresponding synthetic workloads. The optimal combination of parameters can then be selected based on the mapping.

The adaptive approach of setting the parameter values involves starting the scheduler with a default set of parameter values (such as based on the static approach above) for a given set of workloads and their assigned weights. The parameter values are then adjusted, while measuring the resulting I/O throughput and fairness granularity, until an acceptable combination is found.

FIG. 1 illustrates an example arrangement that includes a scheduling system 102 that has a number of queues $Q_1$, $Q_2$, ... $Q_n$, where n is a number greater than or equal to 2 that indicates a number of requesters 104. Each requester can be a software application, a computer, or some other entity (software or hardware) that is able to submit requests to the scheduling system 102.

The scheduling system 102 includes a fair share scheduler 106 that is able to perform fair share scheduling according to some embodiments, where the fair share scheduling is according to (1) specified shares of a shared storage resource 108 assigned to corresponding requesters 104, (2) variable batch sizes, and (3) the bounded concurrency, in some embodiments. The fair share scheduler 106 can be a software module executable on one or more central processing units (CPUs) 108, which is in turn connected to a memory 110. The memory 110 can store tunable parameters 112 for adjusting variable batch sizing and bounded concurrency, in accordance with some embodiments. The fair share scheduler 106 in turn sends requests to an output queue 114. Requests in the output queue 114 in turn are provided to a shared resource system 116 that contains a shared storage resource 108. In some embodiments, the shared storage resource 108 includes one or more storage devices, and the shared resource system 116 can be a storage server. The depth of the output queue 114 is D, where D is equal to the bounded concurrency set by a tunable parameter 112 in the scheduling system 102.

Although the scheduling system 102 and shared resource system 116 are depicted as being two separate systems, note that the scheduling system 102 can be part of the shared resource system 116 in other implementations.

In alternative implementations, the scheduling system 102 can reside in a network switch, in a device driver stack, in a network appliance, and so forth.

The scheduling system 102 is coupled over a link to an administrative station 120. The link can be a local area network (LAN), wide area network (WAN), Internet, and so forth. The administrative station 120 includes administrative software 122 (executable on a CPU 123) to provide an administrative user interface 124 (e.g., graphical user interface or GUI). The administrative user interface 124 can present tunable parameter control elements 126, which a user at the administrative station 120 can use to adjust values of the tunable parameters 112. For example, each of the tunable parameter control elements 126 can be considered a control knob that a user can adjust for increasing or decreasing the value of the corresponding tunable parameter, e.g., batch size for a particular requester, depth of the output queue 114.

Instead of user-settable tunable parameters, the tunable parameters can be dynamically adjusted, such as by a computer, for example.

A goal of the fair share scheduler 106 is to provide a share of the shared storage resource to each of the requesters 104 according to the assigned proportional share of the particular requester, as indicated by the corresponding weight 113 contained in the memory 110 of the scheduling system 102.

In one embodiment, the fair share scheduler 106 uses a variant of a Deficit Round Robin (DRR) scheduling algorithm to move requests from the input queues $Q_1, Q_2, \ldots Q_n$, to the output queue 114. As noted above, to enhance performance, the fair share scheduler 106 is able to trade off short-term fairness and overall system efficiency. Once requests are moved to the output queue 114, such requests are said to be scheduled. Requests are moved from the output queue 114 to the shared storage resource system 116 as fast as the shared storage resource 108 permits and in the order selected by the lower-level scheduler 118.

The basic DRR algorithm performs scheduling decisions in rounds: the DRR algorithm allocates a quantum of tokens to each requester in a round, and the number of tokens is proportional to the requester's weight. The number of requests transferred from the requester's input queue to the output queue is proportional to the number of accumulated tokens the requester has. If the requester has no requests pending in its input queue in a round, the tokens disappear. Otherwise, if there are both requests and tokens left, but there are not enough tokens to send anymore requests, then the tokens persist to the next round (this is the deficit). The DRR algorithm produces throughput proportional to the requester's assigned weight. As discussed further below, an embodiment of the invention uses a variant of the basic DRR algorithm.

In one embodiment, the fair share scheduler 106 operates in rounds; in each round, the fair share scheduler 106 selects a number of requests that is a function of the assigned weights (proportional shares) to the requesters. Once the fair share scheduler 106 makes its decisions, the fair share scheduler 106 passes these requests to the output queue 114 for processing by a lower level scheduler 118. In some embodiments, the lower level scheduler 118 can be omitted, with the requests in the output queue 114 passed directly to the shared resource system 116.

The multi-layered structure of the scheduling mechanism (including the fair share scheduler 106 and lower level scheduler 118) is one of several alternative ways that a fair share scheduler can be implemented; in other implementations, the fair share scheduler can be provided at a device driver, implemented within a network that connects hosts to a shared storage resource, or within controllers of I/O devices.

As noted above, the fair share scheduler 106 employs tunable parameters 112 for improving I/O efficiency. In a first technique, I/O efficiency is improved by setting a bounded concurrency, represented by D, to specify a number of requests that can be concurrently pending in the output queue 114. Note that traditionally, a scheduler specifies the order in which requests are sent from requesters to a shared storage resource, in each round. Typically, this is done a request at a time; in other words, the selected request is serviced first before sending the next request to the shared storage resource. However, such a traditional approach is relatively inefficient in terms of I/O performance as this can reduce throughput potential. For example, if the shared storage resource is a disk array system that has a number of independent disks, multiple requests can be serviced in parallel. If the lower level scheduler 118 is provided in accordance with some embodiments, concurrently pending requests can be reordered to improve performance, such as by reducing mechanical seeks in disk-based storage devices.

In accordance with some embodiments, setting bounded concurrency allows the fair share scheduler 106 to keep at most D requests pending at the shared resource system 116. Note that the shared resource system 116 can impose a maximum value of D; in other words, the fair share scheduler 106 cannot use a value of D greater than this maximum value. If D>1, then the lower level scheduler 118 or the shared storage resource 108 is able to reorder up to D requests. This allows for improving throughput by trying to reduce mechanical latency or by allowing more parallelism within the shared storage resource 108. This approach improves I/O performance, but may relax fairness guarantees.

The other tunable parameter 112 relates to variable batch sizing in which batch sizes for different requesters can be varied. Each requester is associated with a batch size, referred to as $G_i$, where $G_i > S_i$, and where $S_i$ is the number of requests derived from the assigned proportional share of the requester i based on its assigned weight $w_i$, and further derived from the spatial locality of requests. The fair share scheduler 106 can issue up to $G_i$ requests from a requester i in each round. Setting a batch size $G_i > S_i$ potentially improves the performance of sequential requests as it allows the fair share scheduler to maintain spatial locality of such requests so that mechanical latencies (e.g., disk seeks) can be reduced. If the batch size $G_i$ for a requester i is larger than $S_i$ in a particular round, then the fair share scheduler 106 can skip requester i in a subsequent round to make up for the enhanced share of the shared storage resource 108 previously given to the requester i due to the larger batch size $G_i$. The number of rounds missed would be $G_i/S_i - 1$ on average (unless $G_i$ is a whole multiple of $S_i$, in which case the number of rounds missed based on the above calculation is exact). In effect, this technique relaxes the time interval in which the weights (proportional shares) of the requesters are enforced, and thus reduces short-term fairness while gaining I/O efficiency. In other words, the fairness granularity is increased by setting batch sizes $G_i > S_i$.

In accordance with some embodiments, the basic DRR algorithm is modified to allow the fair share scheduler to control the bounded concurrency of the requests at the shared resource system. The other modification is to allow the fair share scheduler to take advantage of spatial locality of a request stream by modifying batch sizes. While increasing concurrency improves I/O efficiency, increasing concurrency also impacts fairness guarantees of the fair share scheduler. High concurrency can lead to loss of fairness, resulting in each requester receiving different throughputs from their assigned weights. There is a value of D, the concurrency bound, where fairness can start decreasing. If D is set too large, then the fair share scheduler behaves like a pass-through scheduler in which all requests are simply just passed to the output, which can cause the scheduler to lose all capability in regulating throughput proportions of the corresponding requesters. The optional value of D can be determined for a particular shared storage resource, and this value of D can be used.

One way to increase the batch size is to increase the batch size of all requesters in a proportionate manner for every round. This, however, may lead to an increase in batch size even for requesters that may not benefit from it. To address this issue, the fair share scheduler 106 is able to set different batch sizes based on locality of the corresponding workload of the requester. The fair share scheduler that uses the DRR algorithm can assign each requester a number of tokens based on its batch size. Since giving a larger batch size than the assigned weight conflicts with the assigned weight, fairness is assured by skipping the particular requester that has been given a larger batch size in one or more subsequent rounds. In such one or more subsequent rounds, the requester is simply not given any tokens for such rounds.

Ideally, it would be desirable to set the batch size large enough to capture the sequentiality of each workload for a requester, but no larger. This can be accomplished by occasionally setting the batch size of the requester to its average recent run length, up to some maximum value. A run is a maximal sequence of requests from a requester that are within a locality threshold distance of a previous request, where a threshold distance can be expressed as a storage size in the example. In one example, the last K ($K \geq 2$) runs of a requester can be tracked, and the lengths of such runs are recorded. The average recent run length is the average of the last K run lengths. This is an example of adaptively varying the batch size of each requester according to the sequentiality of the workload of the requester.

An example technique of controlling concurrency to maximize efficiency while maintaining fairness is discussed below. In order to maximize the efficiency of the shared resource system, the scheduler allows the concurrency bound to increase so long as each active requester has tokens for a round, and has pending requests in its input queue. If the current requester i has no pending requests in the input queue, then the scheduler stops sending requests (thereby decreasing concurrency as requests complete at the shared resource system) until one of two events occurs: (1) either requester i sends a new request (perhaps triggered by the completion of an earlier request); or (2) the requester i completes all its requests in the output queue. In the first case, the scheduler continues adding requester i's requests to the output queue (thereby increasing concurrency). In the latter case, the requester i is declared to be inactive and the scheduler continues serving requests from the next input queue of another requester.

When a particular requester runs out of tokens, the round continues with the next input queue of the next requester. A requester is considered active if the requester has at least one request in the scheduler input queue, in the output queue, or outstanding at the shared resource system. Since every active requester receives the full service it is entitled to in each round, the algorithm guarantees proportional service for all active requesters.

Figure 2:
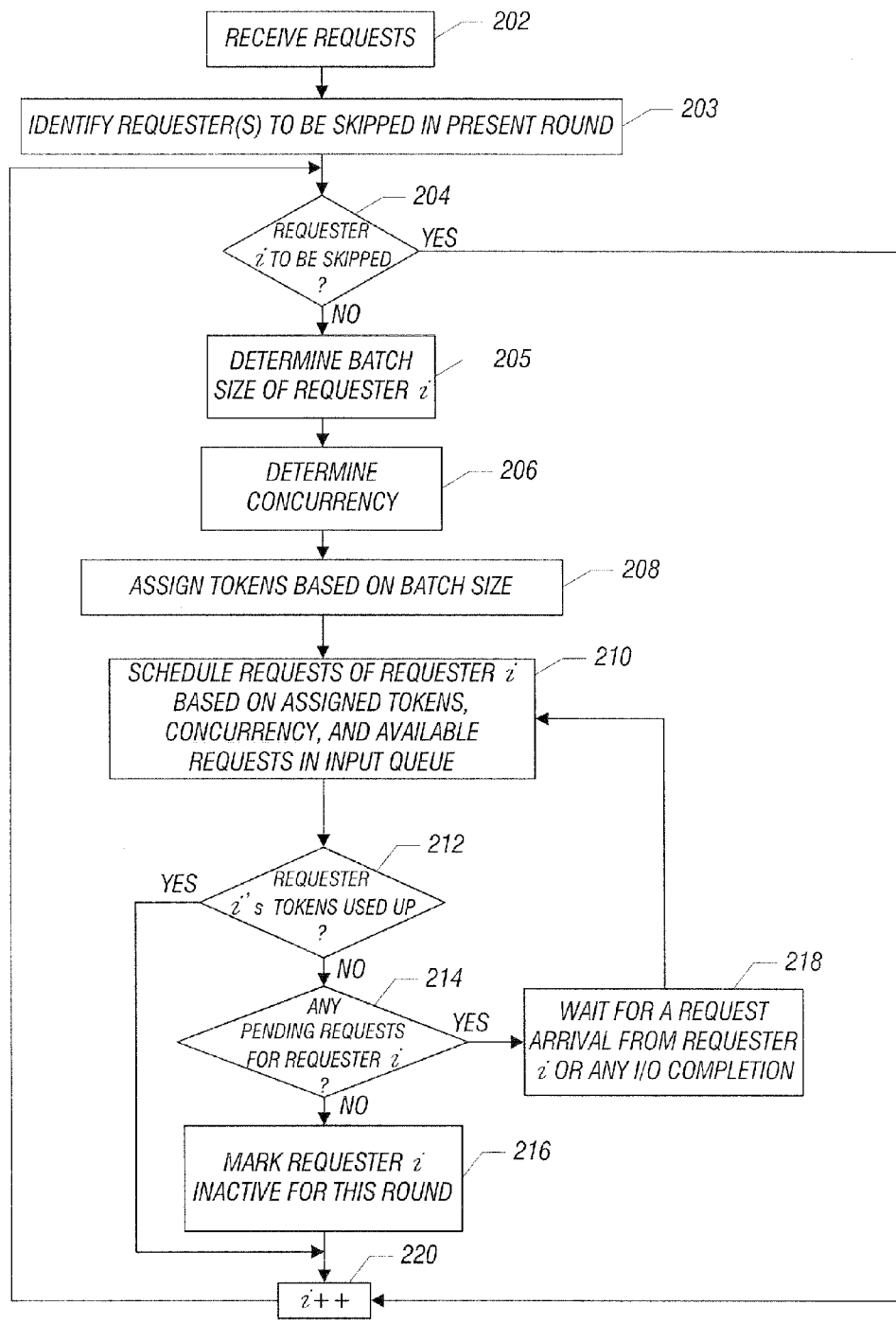
FIG. 2 is a flow diagram of a scheduling process according to an embodiment.

FIG. 2 shows a process performed by the fair share scheduler 106 according to an embodiment. Requests from various requesters are received (at 202) by the fair share scheduler 106. As noted above, scheduling can be performed in rounds, where the scheduler 106 selects a number of requests to schedule. FIG. 2 depicts scheduling processing in a round.

The scheduler 106 determines (at 203) whether any of the requesters are to be skipped based on being assigned more tokens in previous round(s) due to an assigned batch size ($G_i$) greater than the number of requests ($S_i$) derived from the assigned proportional share and spatial locality ($G_i > S_i$, i=1 to n, where n represents the number of requesters). These requesters are identified to be skipped (in other words, i is not set to correspond to any such requester). In other words, in each round, requests from requesters i (i from 1 to n, except those identified to be skipped) are processed.

The scheduler then determines (at 204) whether requester i is to be skipped. If so, the scheduler proceeds to the next requester by incrementing i (at 220). However, if requester i is not to be skipped, then the process scheduler proceeds to task 205.

The scheduler determines (at 205) the batch size for requester i. Note that the batch size for requester i can be adaptively determined, such as based on average run length, as discussed above.

Once the batch size is determined, the scheduler 106 next determines (at 206) the concurrency to use for requester i. For example, as discussed above, the concurrency can be increased so long as requester i has tokens for a round, and has pending requests to its input queue. Note that concurrency could be reduced as requests of the requester i decreases. Given the assigned batch size, the concurrency assigned, can be increased up to an upper bound (maximum concurrency) such that the fairness granularity remains less than some fairness granularity maximum value.

In one embodiment, the scheduler 106 then assigns (at 208) tokens to requester i according to the batch size determined at 206.

The scheduler 106 next schedules (at 210) requests of requester i by moving such requests from the requester's input queue $Q_i$ (i=1 to n) to the output queue 114. The number of the requests that can be scheduled depends on the assigned number of tokens, the concurrency, and the availability of requests from requester i in the corresponding input queue. The number of tokens (based on the batch size) specifies the number of requests that can be sent consecutively to the output queue, and the concurrency specifies the number of requests that can be moved to the output queue 114. The availability of requests refers to the number of requests that have actually been submitted by requester i.

Next, the scheduler 106 determines (at 212) if the number of tokens for requester i have been used up. If so, the scheduler proceeds to the next requester by incrementing i (at 220). If the number of tokens for requester i have not been used up, then the scheduler 106 checks (at 214) if there are any pending requests from requester i, whether in the input queue, the output queue, or the shared storage resource system 116. If no requests are pending, then requester i is marked (at 216) as inactive for this round, and the scheduler proceeds to the next requester (by incrementing i at 220).

If there are requests pending for requester i, as determined at 214, then the scheduler 106 waits for either a request arrival from requester i or an I/O completion (from any workload of any requester) and returns to task 210 in the present round (without adding any additional tokens for requester i.

If all requesters have been processed, then the present scheduling round is completed, and processing proceeds to the next round.

In other embodiments, other ways of setting the tunable parameters (batch sizes, concurrency) can be used. In one such other example approach, a greedy search approach can be used. The greedy search approach operates in multiple steps. At each step, the scheduler chooses a parameter and a setting for that parameter that improves I/O efficiency most while keeping the fairness within an allowable range. When there is no more improvement in I/O efficiency, the parameter settings from the last step is adopted.

In another example, an optimization approach has the same constraints and utility criteria as in the greedy search approach. However, instead of a one-step at a time improvement in I/O efficiency, the optimization approach tries to find the best setting for all the parameter values by using a known optimization technique, such as a steepest gradient search.

Instead of using a DRR scheduling algorithm, another algorithm can be used, such as a modified virtual-time based fair scheduler, such as SSFQ-D (start-time fair queuing with depth D).

Instructions of software described above (including the fair share scheduler 106, lower level scheduler 118, and administrative software 122 of FIG. 1) are loaded for execution on a processor (such as one or more CPUs 108 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of scheduling requesters of a shared storage resource, comprising:
    specifying, by a scheduler, relative fairness for the requesters of the shared storage resource, wherein the specified relative fairness relates to proportional shares of the shared storage resource allocated to the corresponding requesters; and
    in response to requests of the requesters, modifying performance of the scheduler to deviate from the allocated proportional shares to improve input/output (I/O) efficiency in processing the requests at the shared storage resource;
    submitting, by the scheduler, the requests of the requesters to a lower level scheduler; and
    reordering, by the lower level scheduler, the submitted requests to improve I/O efficiency at the shared storage resource.

2. The method of claim 1, wherein modifying performance of the scheduler comprises modifying at least one parameter associated with the scheduler according to workloads of the requesters.

3. The method of claim 2, wherein modifying the at least one parameter comprises modifying batch sizes for corresponding requesters, wherein a batch size specifies a number of requests from a respective requester that is able to be scheduled consecutively.

4. The method of claim 3, wherein modifying the batch sizes for corresponding requesters comprises increasing at least one of the batch sizes for a particular one of the requesters to greater than a proportional share assigned to the particular requester.

5. The method of claim 3, further comprising:
assigning tokens to the requesters based on the corresponding batch sizes of the requesters; and
scheduling the requests of the requesters according to the assigned tokens.

6. The method of claim 5, further comprising:
scheduling, by the scheduler, requests of the requesters in rounds; and
determining a particular requester to skip in at least one subsequent round based on detecting that the particular requester has been assigned a batch size greater than a number of requests derived from a proportional share of the shared storage resource assigned to the particular requester.

7. The method of claim 2, wherein modifying the at least one parameter comprises modifying a concurrency that specifies a number of requests of a requester that can be outstanding at the shared storage resource.

8. The method of claim 7, wherein modifying the concurrency controls a number of requests that can be outstanding in an output queue storing requests scheduled for processing at the shared storage resource.

9. The method of claim 2, wherein modifying the at least one parameter comprises modifying a total concurrency that specifies a total number of requests that can be outstanding at the shared storage resource.

10. The method of claim 1, wherein modifying the performance of the scheduler to deviate from the specified relative fairness to improve I/O efficiency in processing the workloads at the shared storage resource causes a relaxation of a fairness granularity for the requesters.

11. The method of claim 1, wherein modifying performance of the scheduler comprises modifying at least one parameter associated with the scheduler using one of a static approach and an adaptive approach,
wherein modifying the at least one parameter using the static approach comprises:
measuring characteristics of synthetic workload combinations;
mapping characteristics of an actual set of workloads to characteristics of the synthetic workload combinations; and
setting a value of the at least one parameter according to the mapping,
wherein modifying the at least one parameter using the adaptive approach comprises:
measuring a resulting fairness granularity and I/O efficiency for an actual set of workloads given an initially value of the at least one parameter; and
changing the value of the at least one parameter according to the measuring.

12. A system to schedule requests of requesters for a shared storage resource, comprising:
a non-transitory computer-readable storage medium encoded with instructions to implement a scheduler and a lower lever scheduler; and
a processor to execute the instructions, wherein the instructions, when executed, cause the processor to:
receive, with the scheduler, information relating to proportional shares of the shared storage resource for corresponding requesters, wherein the proportional shares are for a fairness granularity;
relax, by the scheduler, the fairness granularity to enhance input/output (I/O) efficiency at the shared storage resource in processing the requests of the requesters, wherein relaxing the fairness granularity involves providing at least one of the requesters a greater share of the shared storage resource than the corresponding proportional share;
submit, by the scheduler, the requests of the requesters to the lower level scheduler; and
reorder, by the lower level scheduler, the submitted requests to improve I/O efficiency at the shared storage resource.

13. The system method of claim 12, wherein the instructions, when executed, further cause the processor to:
schedule the requests of the shared storage resource in rounds; and
skip the at least one requester in a subsequent round in response to providing the at least one requester a greater share of the shared storage resource than the corresponding proportional share.

14. An article comprising at least one non-transitory computer-readable storage medium containing instructions that when executed cause a computer to:
specify, by a scheduler, relative fairness for the requesters of a shared storage resource;
in response to workloads of the requesters, modify performance of the scheduler to deviate from the specified relative fairness to improve input/output (I/O) efficiency in processing the workloads at the shared storage resource;
submit, by the scheduler, the requests of the requesters to a lower level scheduler; and
reorder, by the lower level scheduler, the submitted requests to improve I/O efficiency at the shared storage resource.

15. The method of claim 1, wherein the allocated proportional shares are indicated by corresponding weights stored in a storage medium.

16. The system of claim 12, wherein the information relating to the proportional shares includes corresponding weights stored in a storage medium.

17. The article of claim 14, wherein the relative fairness relates to proportional shares of the shared storage resource allocated to the corresponding requesters, wherein modifying the performance of the scheduler deviates from the allocated proportional shares.

* * * * *

UNITED STATES PATENT AND TRADEMARK OFFICE
CERTIFICATE OF CORRECTION

PATENT NO.        : 8,392,633 B2                               Page 1 of 1
APPLICATION NO.   : 12/243216
DATED             : March 5, 2013
INVENTOR(S)       : Ajay Gulati et al.

It is certified that error appears in the above-identified patent and that said Letters Patent is hereby corrected as shown below:

On the Title Page

Item (60) insert the heading --Related U.S. Application Data--, and under the heading insert --Provisional application no. 61/075,395, filed on June 25, 2008.--

In the Specification

In column 1, starting at line 4, insert the following before "BACKGOUND":

--CROSS REFERENCE TO RELATED APPLICATIONS
This Application claims the benefit of U.S. Provisional Application serial number 61/075395, filed 06/25/08, title "Scheduling Requesters Of A Shared Storage Resource" which is hereby incorporated by reference herein as if reproduced in full below.--

In the Claims

In column 10, line 20, in Claim 13, after "system" delete "method"

Signed and Sealed this
Thirtieth Day of June, 2015

Michelle K. Lee
*Director of the United States Patent and Trademark Office*